United States Patent [19]
Lawrence

[11] 4,223,468
[45] Sep. 23, 1980

[54] METHOD AND APPARATUS FOR TERMITE CONTROL

[76] Inventor: Lucas G. Lawrence, 2710 N. State St., San Bernardino, Calif. 92405

[21] Appl. No.: 902,949

[22] Filed: May 5, 1978

[51] Int. Cl.² .............................................. A01M 3/00
[52] U.S. Cl. .................................................. 43/132 R
[58] Field of Search ...................... 43/112, 124, 132 R, 43/98; 250/492 B; 325/102, 111, 118, 119

[56] References Cited

U.S. PATENT DOCUMENTS

| 855,588 | 6/1907 | Prudden | 43/98 X |
| 3,258,872 | 7/1966 | Senkewich | 43/112 X |
| 3,732,497 | 5/1973 | Campman | 325/111 X |
| 3,971,292 | 7/1976 | Paniagua | 43/112 X |

*Primary Examiner*—Nicholas P. Godici
*Attorney, Agent, or Firm*—Christie, Parker & Hale

[57] ABSTRACT

An apparatus and method for controlling pests, particularly termites. The method involves the application of broad band, high-voltage electrical energy to termite shelter tubes, galleries and nests and to the bodies of the termites themselves. Killing of termites is accomplished directly by electroshock and indirectly by interference with the digestive processes of the termites. The apparatus is a probe gun incorporating circuitry for generating an electric signal having a voltage in the 100,000 volt range and a frequency range of 0–500 kHz.

12 Claims, 4 Drawing Figures

METHOD AND APPARATUS FOR TERMITE CONTROL

DESCRIPTION OF THE PRIOR ART

BACKGROUND OF THE INVENTION

The present invention relates to the control of pests, particularly termites and fire ants and, in particular, relates to the control of termites by the application of electric currents.

The current methodology for control of pests such as termites and fire ants has involved the use of dangerous pesticides and chemicals of a poisonous nature applied to the infested structure. The application of such pesticides and poisons constitutes an inconvenience and a hazard from a number of different points of view. In the first instance, in the usual case, the application of pesticides requires evacuation of the structure to be fumigated and the removal of food and other consumable products to prevent their being contaminated by the application of the pesticide. More importantly, the use of pesticides presents an environmental hazard in terms of the residuum left after their use. As in the case of pesticides used in agricultural applications, termite pesticides pose a lingering hazard by being leached into soil and streams where they can later be a threat to plant and animal life.

Summary of the Present Invention

The present invention provides a method for controlling and eliminating termites by applying electrical voltage to termite-infested areas.

In another aspect, the invention provides an apparatus for applying electric energy to pest-infested structures. The apparatus comprises a portable housing and a source of electric energy. To the source of energy is connected means for generating a high voltage radio frequency signal located within the housing. An output electrode is connected to the generating means and extends from the housing. The electrode is disposed so as to deliver high-voltage radio frequency electrical energy to the infested structure.

The method of the present invention is accomplished utilizing several specific means. The first is the use of a portable gun whereby a high-voltage radio frequency electric signal is directly contacted to termite-infested woodwork. The moisture characteristic of the tubes, galleries, nests and bodies of termites provide a sufficiently good conductive path to overcome the insulating properties of wood which the termites normally infest and transmit the electric energy to the termites. Those termites near the point of energy application are killed instantly and those located more distantly are eliminated by virtue of the effect of electricity on digestive processes and on feeding of the non-foraging elements of a pest colony. Termites are located by conventional methods, such as locating deposits of ejected excrements, physically probing suspected areas of infestation and using acoustical methods. Energy can be applied at any point along the galleries and tubes or directly into the nest. Once the nest is located, an electrode is injected into it and the pests are eliminated by applying the high-voltage radio frequency energy directly to the electrode. Application of electricity to the nest has the effect of killing the queen termite, causing the colony to cease foraging and to die out.

Description of the Drawings

These and other advantages of the invention will be better understood by reference to the drawings wherein.

Description of a Specific Embodiment

Figure 1:
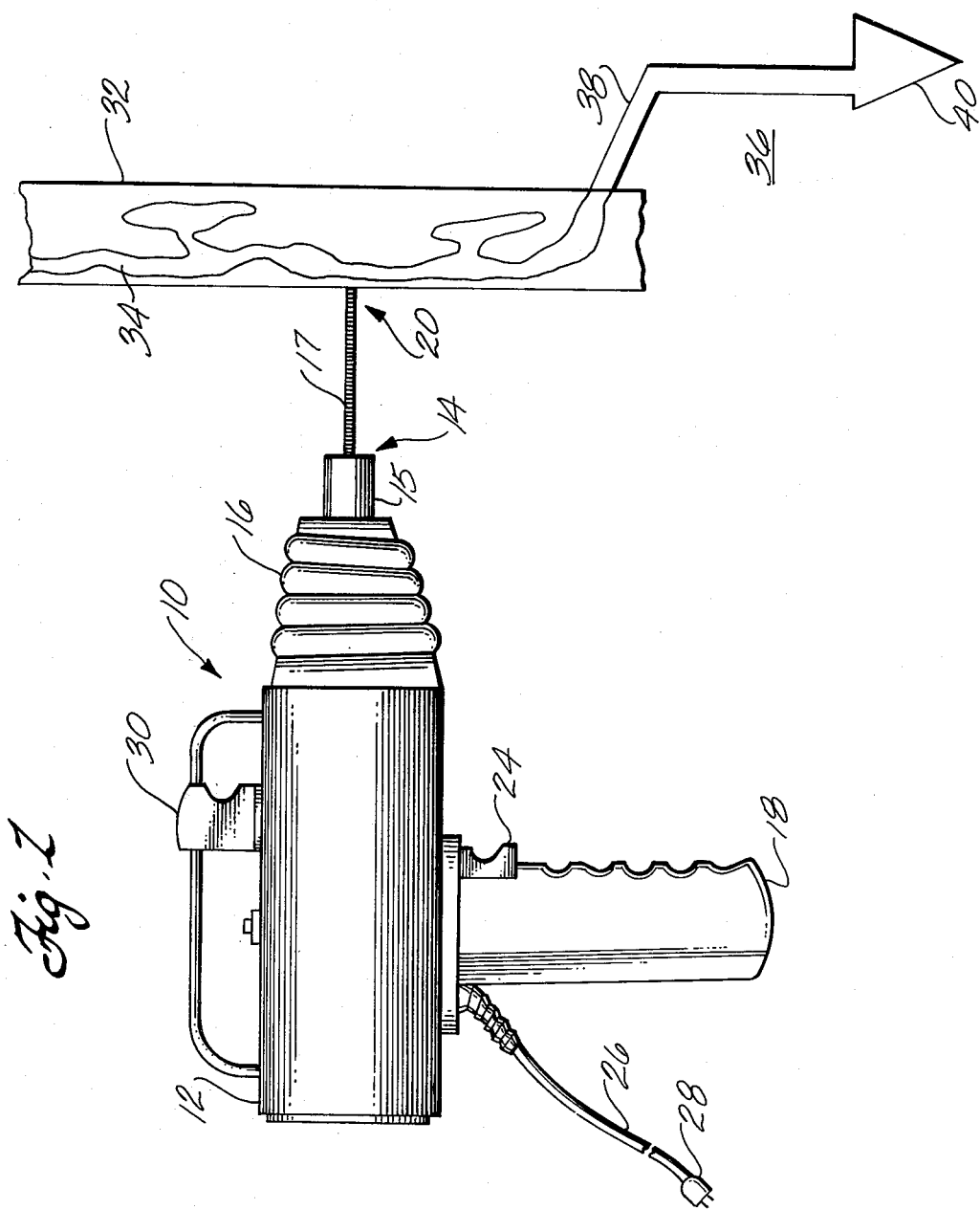
FIG. 1 is an elevation view of a hand-operated gun for application of electrical energy to a pest-infested locality.

As shown in FIG. 1, the apparatus and method of the present invention utilizes a gun or apparatus 10 in the form of a handtool having a housing 12 containing the electrical circuitry for generating a high-voltage discharge. A discharge tip 14 is mounted on an insulator 16 at the front end of the gun. Tip 14 has a base 15 mounted in a conductive receptacle located at the front of insulator 16. A spring loaded probe 17 extends from base 15. A hand grip 18 is utilized by the operator to direct the gun at the area 20 to which a high-voltage radio frequency electric energy signal is to be applied by operation of trigger 24 on the gun. Conventional electric line power is supplied to the gun by means of conductor 26 which terminates in a conventional plug 28 for connection to a normal A.C. outlet. A light 30 is provided at the top of the gun to provide illumination directed at the area to which the probe 17 is to be contacted. The spring-loaded tip facilitates contact with the surfaces of the areas to be treated. In the preferred practice of the method, the probe is directly contacted to the area to be treated. The gun is then moved in a predetermined pattern such as a back-and-forth sweeping motion over the surface.

In FIG. 1, a section of termite-infested wood 32 is shown, in which are located termite galleries 34, extending through the wood 32 and thence into the ground 36 through shelter tubes 38 to a termite nest 40 located in moist ground beneath the structure. The galleries, tubes and nests are characterized by a conductive moisture secreted by the termites as they pass through the various passages which is conductive. By application of a high-voltage radio frequency current, the electric current is conducted by this moisture through the galleries and tubes and other moist biomass, including termites themselves and their feces and detritus, producing extermination in one of several ways.

In the first instance, the termites near the point of contact of probe 17 are subjected to the sufficiently high level of electric current and are killed immediately by electroshock. If the subjection of the termite-infested area and the termites to an electric current is not sufficient to kill the termites, by electroshock because of their relative remoteness from the point of contact, the electric currents are still sufficient to disrupt their biological processes, ultimately resulting in their extermination or starvation.

In this latter situation, the subjection to electric current interferes with the digestive processes of the worker termites, preventing proper digestion and causing the termites to starve. The electric currents are believed to inhibit the action of bacteria or protozoans in converting cellulose into sugar and enzymes in the digestive systems of the foraging elements of the termite colony. The interference with the digestive processes of the foraging termites also means that the feeding of the non-foraging elements of the colony becomes impossible and, thus, the entire colony either starves out or is decimated by natural predators due to the defensive incapability of the termite colony.

Figure 2:
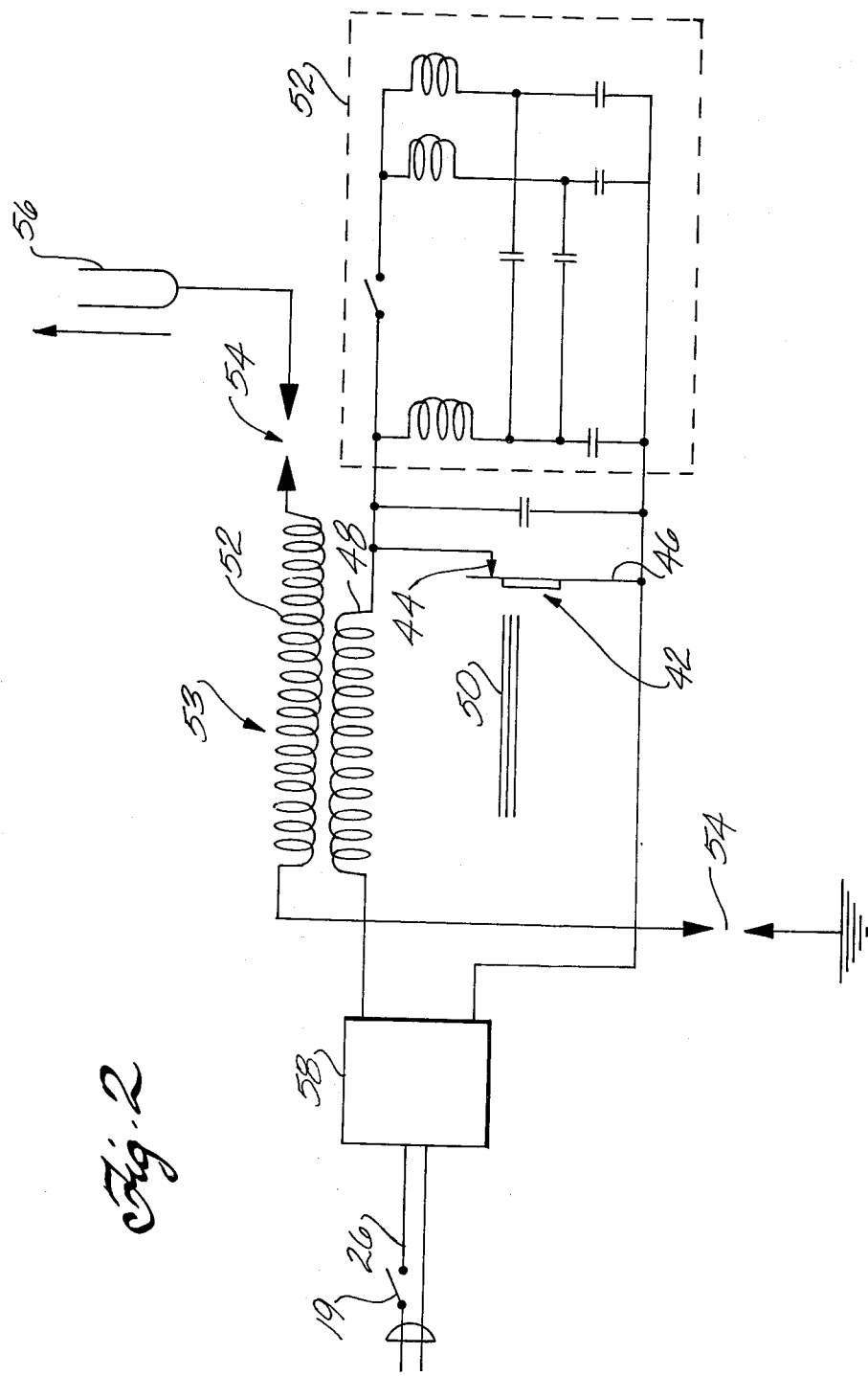
FIG. 2 is a schematic diagram of the electric circuitry utilized in the gun of FIG. 1.
Figure 3:
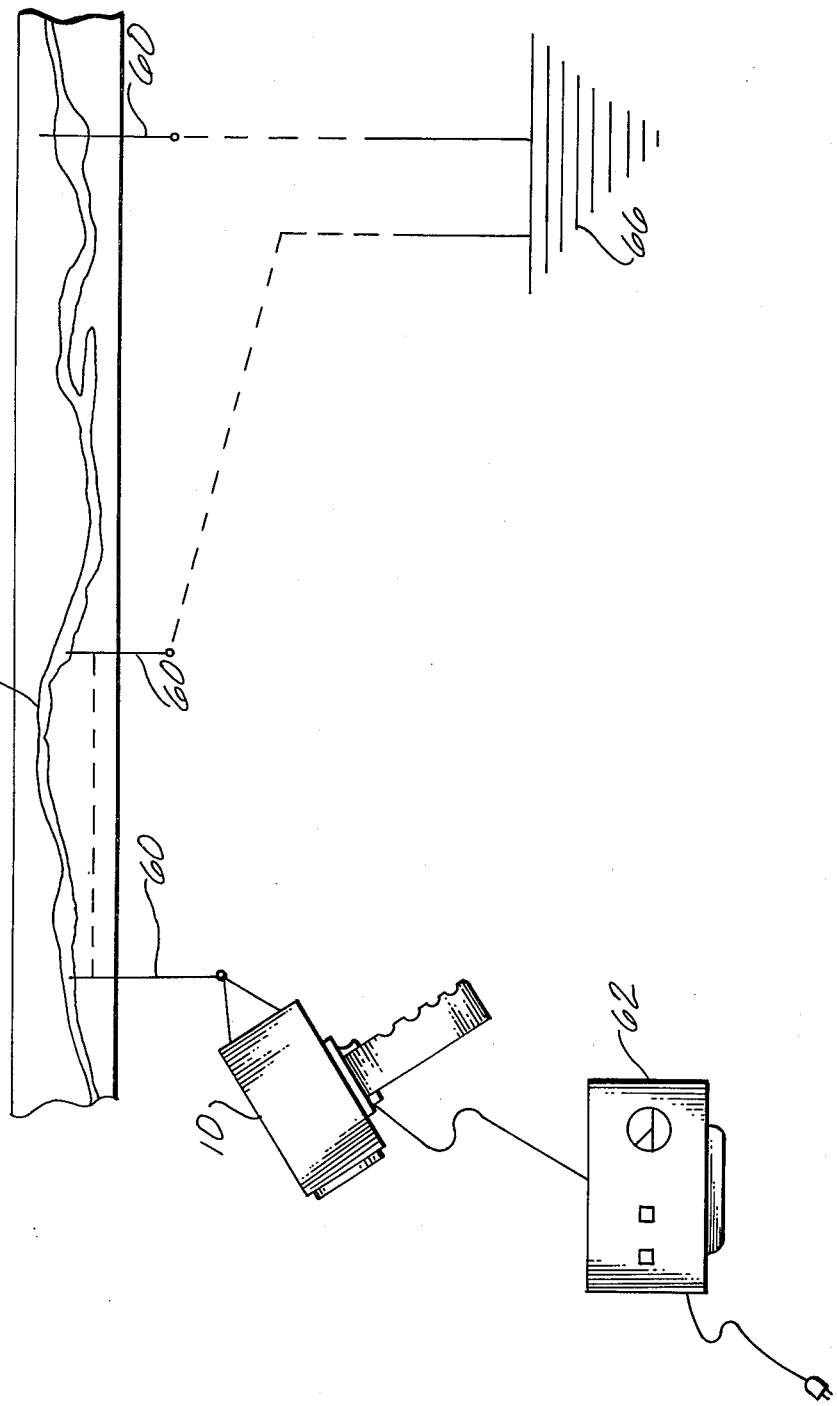
FIG. 3 is a diagrammatic illustration of the use of the apparatus of FIG. 1 in an alternate embodiment of the invention having particular application to drywood termites.

The electric circuitry of the gun 10 of FIG. 1 is shown in FIG. 2. As shown therein, the circuitry includes a vibrator 42 having a contact 44 and an armature 46 in series with a coil 48. When electric energy is supplied to coil 48 by the closing of switch 19, armature 46 is attracted to core 50 of inductor 48 which acts as an electromagnet and the point of contact between the armature and contact 44 opens. This opens the circuit supplying energy to the inductor 48 and causes the armature of the vibrator, which is spring-biased, to close contact again with contact 44. As long as energy is applied to the coil, the opening and closing action of the vibrator-operated inductor continues. Inductor 48 is also the primary winding of an output transformer 53 which supplies high-voltage radio frequency energy to the output electrode.

An LC resonator 52 is connected in parallel circuit relationship with the vibrator-operated inductor 48 and acts as a tank circuit to provide a spectrum of frequencies which modulate the vibrator-produced signal. By virtue of a very high secondary-to-primary turns ratio, a very high voltage signal, on the order of 50,000 to 100,000 volts at a current level of approximately 500 microamperes is induced in secondary winding and transmitted by a safety spark gap 54 to output electrode 56. The spark gaps 54 prevent line power from being transmitted through gun 10 while providing a low impedance path to high-voltage RF signal. The result is a high-voltage radio frequency signal which has a broad spectrum of fundamental and harmonic frequencies, in the range of 60 Hz to 500 kHz, which is discharged in burst or pulses from the electrode 56 to the termite-infested area.

An RF filter 58 is connected between the circuitry of the electron gun and the line 26 transmitting conventional line power to the gun. Filter 58 prevents radio frequency interference from the gun circuitry from being transmitted back to the power line 26 and causing interference in the operation of radios and T.V.'s on the same line.

The apparatus illustrated in FIG. 1 is particularly applicable for use with subterranean termites which nest and move between the moisture-containing ground and the wood-containing materials on which the termites feed. The present invention is also applicable to use with drywood termites. Because such species do not migrate into the subsoil to acquire moisture and, thus, do not establish electrically-conductive paths, a plurality of auxiliary electrodes 60 are driven through the wood and into the termite galleries. Alternatively, the conductivity of the galleries is enhanced by introducing a conductive fluid therein. The high-voltage gun 10 is then brought into contact with one of the electrodes and energized by supplying power thereto from a D-C power supply 62. The point of application of the conductive fluid is a point of entry into the termite infested area. The high-voltage energy is conducted by the slightly-conductive termite galleries and other conductive paths to the other auxiliary electrodes 60 which are grounded to complete the circuit. Current flows through the galleries 64 and thence to ground 66. The energy supplied by gun 10 is, again, a high-voltage radio frequency signal. Upon encountering the termites and termite nests, the effect in terms of producing death of the termites by electroshock or by interference with the digestive processes causing starvation and weakening of the colony is again the result.

Figure 4:
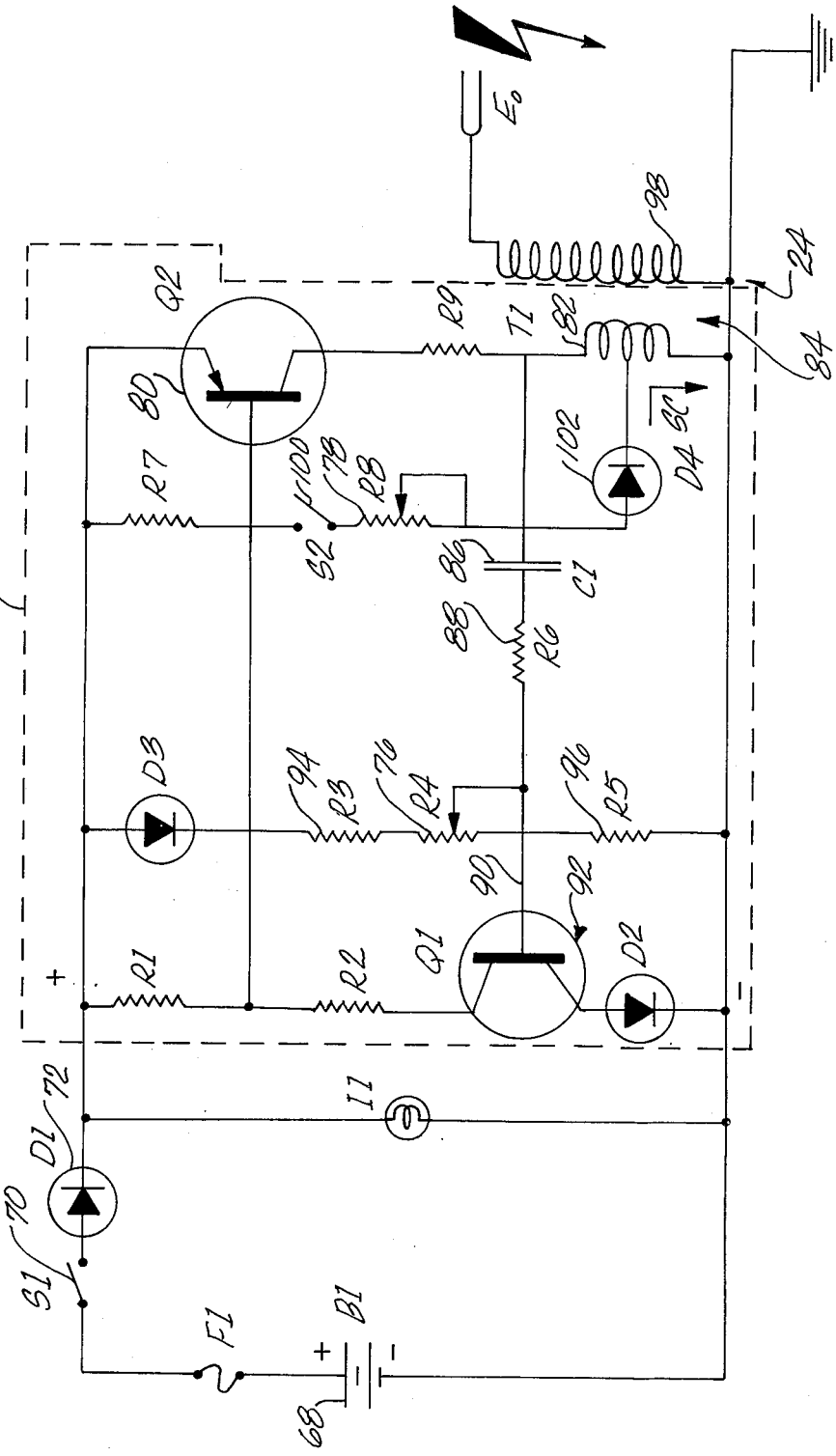
FIG. 4 is a schematic diagram of an alternate embodiment of the circuit of FIG. 2.

In addition to the vibrator-operated inductor of FIG. 2, high-voltage radio frequency energy is also provided in an alternate embodiment by means of the oscillator circuit illustrated in FIG. 4. As shown therein, the oscillator comprises a D-C power supply 68 connected by means of an operating switch 70 through a blocking diode 72 to an oscillator circuit 74. Oscillator 74 is a feedback-relaxation type of oscillator. Frequency adjustment is accomplished by means of potentiometer 76 and voltage intensity adjustment is accomplished by potentiometer 78. The oscillator output is provided by a power transistor 80 which is a power transistor connected in a common emitter configuration. The timing of the oscillator is a function of the saturation of the primary winding 82 of transformer 84. The timing pulse is transmitted via capacitor 86 and resister 88 to the base electrode 90 of transistor 92. The time constant of capacitor 86, together with resistors 94, 76, 96 and 88, determine the effective length of the oscillator's timing cycle. A voltage is induced in winding 82 and, by virtue of the turns ratio stepped up to a very high voltage in secondary winding 98 to provide an output voltage of approximately 100,000 volts. The frequency band of the output signal is 60 Hz to 600 kilohertz, again in the microampere range. By adjusting the "Q" of the transformer, frequency and voltage intensity adjustments can be obtained.

What is claimed is:

1. An apparatus for applying electrical energy to termite infested structures comprising:
   a portable housing;
   a source of electrical energy;
   electric current means connected to the energy source for generating high voltage radio frequency electrical energy pulses;
   an output electrode connected to the radio frequency generating means extending from the housing; and
   structure contacting means on the output electrode for establishing physical contact with the termite infested structure to deliver high voltage radio frequency energy pulses by electrical conduction to said infested structure.

2. An apparatus according to claim 1 wherein the electric circuit means for generating the high-voltage radio frequency electric energy is pulses a vibrator-operated inductor.

3. An apparatus according to claim 1 wherein the electric circuit means for generating the high-voltage radio frequency electric energy pulses is an oscillator.

4. An apparatus according to claim 1 including an output transformer connected between the generating means and the output electrode for stepping up the output voltage from the generating means.

5. An apparatus according to claim 4 wherein the output electrode and the output transformer are closely spaced to reduce energy losses therebetween to a minimum.

6. An apparatus according to claim 1 including means for controlling the output energy level.

7. An apparatus according to claim 6 including means for controlling the frequency spectrum of the high-voltage signal.

8. A method of controlling termite infestation in wooden structures comprising the steps of
   (1) locating the area of termite infestation in the structure; and
   (2) electrically contacting the area of infestation with a source of high-voltage radio frequency electrical energy pulses to cause electric currents to be electrically conducted into and transmitted through the infested area of the structure.

9. A method according to claim 8 including the step of enhancing the conductivity of the infested area prior to contacting the source of high-voltage energy to the structure.

10. A method according to claim 9 wherein the step of enhancing the conductivity of the infested area includes the step of applying a conductive fluid to an entry into said area.

11. A method according to claim 9 wherein the step of enhancing the conductivity of the infested area includes the step of inserting a plurality of spaced apart electrodes into the structure at predetermined intervals and connecting at least one of said electrodes to an electrical ground.

12. A method of controlling termite infestation comprising the step of physically applying and electrically contacting the area of infestation with a source of high voltage radio frequency electric energy pulses to cause electric currents to be electrically conducted into and through the area of termite infestation.

* * * * *